United States Patent [19]

Barthelemy

[11] 4,416,345

[45] Nov. 22, 1983

[54] ROTARY ASSISTANCE MECHANISMS, MORE ESPECIALLY FOR VEHICLE STEERING

[75] Inventor: Andre Barthelemy, Saint-Remy-les Chevreuse, France

[73] Assignees: Automobiles Citroen; Automobiles Peugeot, both of Paris, France

[21] Appl. No.: 315,048

[22] Filed: Oct. 26, 1981

[30] Foreign Application Priority Data

Oct. 27, 1980 [FR] France ................. 80 22967

[51] Int. Cl.³ .............................................. B62D 5/04
[52] U.S. Cl. .............................. 180/79.1; 74/388 PS
[58] Field of Search .................... 180/79.1; 74/388 PS

[56] References Cited

U.S. PATENT DOCUMENTS

| | | | |
|---|---|---|---|
| 2,833,154 | 5/1958 | Barnes et al. ......................... | 74/388 |
| 3,511,104 | 5/1970 | Piat ..................................... | 180/79.1 |
| 3,534,623 | 10/1970 | Goodacre et al. ................. | 180/79.1 |
| 4,223,254 | 9/1980 | Adams ............................... | 180/79.1 |
| 4,241,804 | 12/1980 | Deininger et al. ................. | 180/79.1 |
| 4,250,765 | 2/1981 | Niklaus et al. .................... | 74/388 PS |

FOREIGN PATENT DOCUMENTS 1096781 6/1955 France.
92889 1/1969 France.
2417676 9/1979 France.

Primary Examiner—Joseph F. Peters, Jr.
Assistant Examiner—Donn McGiehan
Attorney, Agent, or Firm—Stevens, Davis, Miller & Mosher

[57] ABSTRACT

An assistance mechanism is provided, which is adapted to be coupled to a driven member capable of rotating alternately in both directions, in response to the rotation of a drive shaft. The assistance mechanism comprises a motor, a device for reducing the speed of the motor and at least one clutch actuated by a controller. The controller includes a part which is coaxial with the driven member and slides against a resilient return spring in relation to the amplitude and the direction of the torque applied by the drive shaft. Each clutch is mounted on a shaft of the device for reducing speed, which rotates faster than the driven member. The controller further comprises a connection between the sliding part and the clutches.

This rotary assistance mechanism is particularly suitable for use in conjunction with vehicle steering mechanisms.

9 Claims, 3 Drawing Figures

ROTARY ASSISTANCE MECHANISMS, MORE ESPECIALLY FOR VEHICLE STEERING

BACKGROUND OF THE INVENTION

The invention relates to a rotary assistance mechanism adapted to be coupled to a driven member capable of alternately rotating in two directions in response to the rotation of a drive shaft. This mechanism comprises a motor, means for reducing the speed of the motor and at least one clutch actuated by control means. The control means includes a part, coaxial with the driven member, which slides against a resilient return means in relation to the amplitude and the direction of the drive torque.

The invention relates more particularly to the use of such rotary assistance mechanism for motor vehicle steering.

The aim of the invention is to make rotary assistance mechanisms of the kind in question more responsive and to make their working conditions less severe.

SUMMARY OF THE INVENTION

According to the invention, the rotary assistance mechanism is adapted to be coupled to a driven member capable of alternately rotating in two directions, in response to the rotation of a drive shaft. The rotary assistance mechanism is characterized by the fact, that each clutch is mounted on a shaft of the speed reduction means which rotates more rapidly than the driven member. In this mechanism, the control means comprises connection means which is located between said sliding part and said clutch(es).

Advantageously, the connection means are formed by a mobile plate cooperating with the sliding part.

The mobile plate may be rigidly interlocked with the sliding part and mounted to freely rotate on the driven member or on the drive shaft coaxial with this driven member.

According to another embodiment of this invention, the mobile plate includes a lever, an intermediate part which cooperates with the sliding part and endmost parts which are connected, respectively, to a casing containing the means for reducing the speed of the motor, and to a mobile element of each clutch.

Advantageously, each clutch is disposed directly on the output shaft of the motor.

When the motor is provided for rotation in a single direction, the speed reduction means comprise a reduction-gear train and means for reversing the direction of rotation. A first clutch connects the motor directly to the reduction-gear train through the reversing means, wherein the two clutches are coaxial to the output shaft and alternately engaged by actuation of the control means.

The invention consists of, apart from the arrangements outlined above, certain other arrangements which will be more explicitly described in detail with reference to the accompanying drawings. The embodiments shown in these drawings are not intended to be limiting.

DETAILED DESCRIPTION OF THE DRAWINGS

Figure 1:
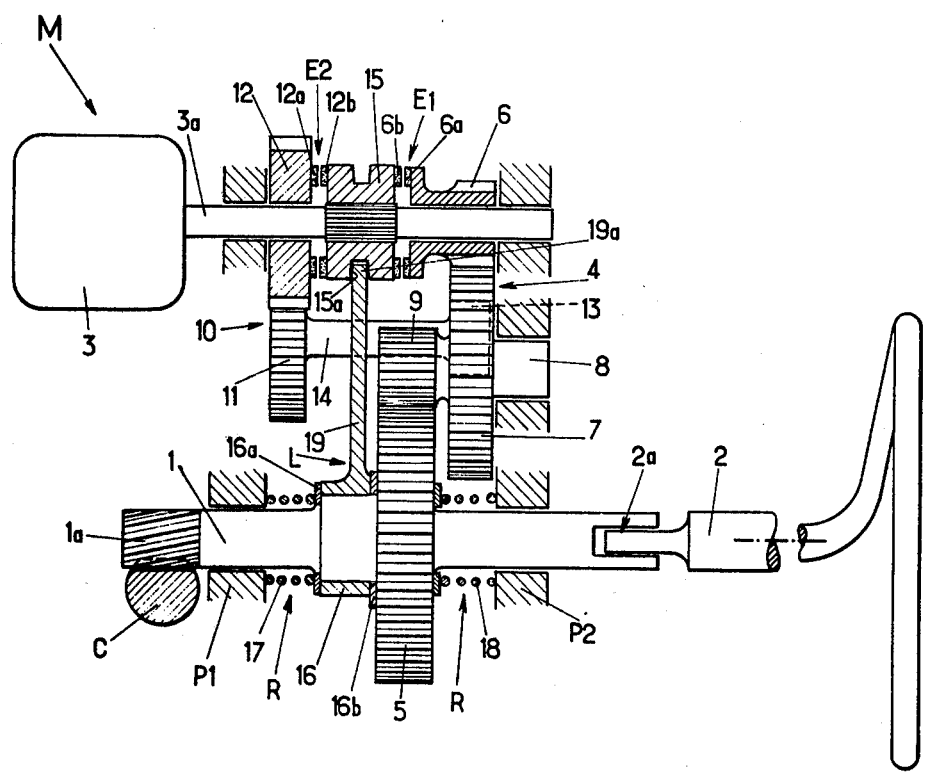
FIG. 1, of these drawings, shows schematically a rotary assistance mechanism for vehicle steering in accordance with the invention.

FIG. 1 of the drawings shows a rotary assistance mechanism M adapted to be coupled to a rotary driven member 1, such as a rack steering pinion C for a motor vehicle. The driven member 1 is able to rotate alternately in both directions in response to the rotation of a coaxial drive shaft 2. The rotational connection between driven member 1 and drive shaft 2 is provided by any conventional coupling means 2a which allows for sliding.

The driven member 1, which is slidably mounted in bearings P1, and P2, have teeth 1a. These teeth are inclined with respect to the direction of its axis so that during the transmission of a torque, the reaction of teeth 1a against the cooperating teeth of rack C has an axial component which causes member 1 to slide against resilient return means R. The mechanism M comprises a motor 3, preferably an electric motor, adapted to rotate in a single direction, and means 4 for reducing the speed of the motor, so as to allow the rotary member 1 to be driven at a reduced speed. The speed reduction means 4 comprises a gear-train in which the more slowly turning gearwheel 5 is integral with the driven member 1. The most rapidly rotating pinion 6 is mounted loosely on the output shaft 3a of motor 3. This pinion 6 meshes with a gearwheel 7 carried by an intermediate shaft 8 of the reducer. This gearwheel 7 is integral with a coaxial pinion 9, which has a smaller diameter than gearwheel 7. Pinion 9 meshes with gearwheel 5.

Pinion 6 may be rotatably connected to shaft 3 through a first clutch E1.

A reversing means 10, comprising a plurality of reversing gears, is also provided to reverse the direction of rotation of said gear train. The reversing means includes meshing gearwheels 11 and 12 which have the same diameter. Gearwheel 12 is mounted loosely on shaft 3a, while gearwheel 11 is integral with a pinion 13 of the same diameter as pinion 6. Pinion 13 meshes with the same gearwheel 7.

Figure 3:
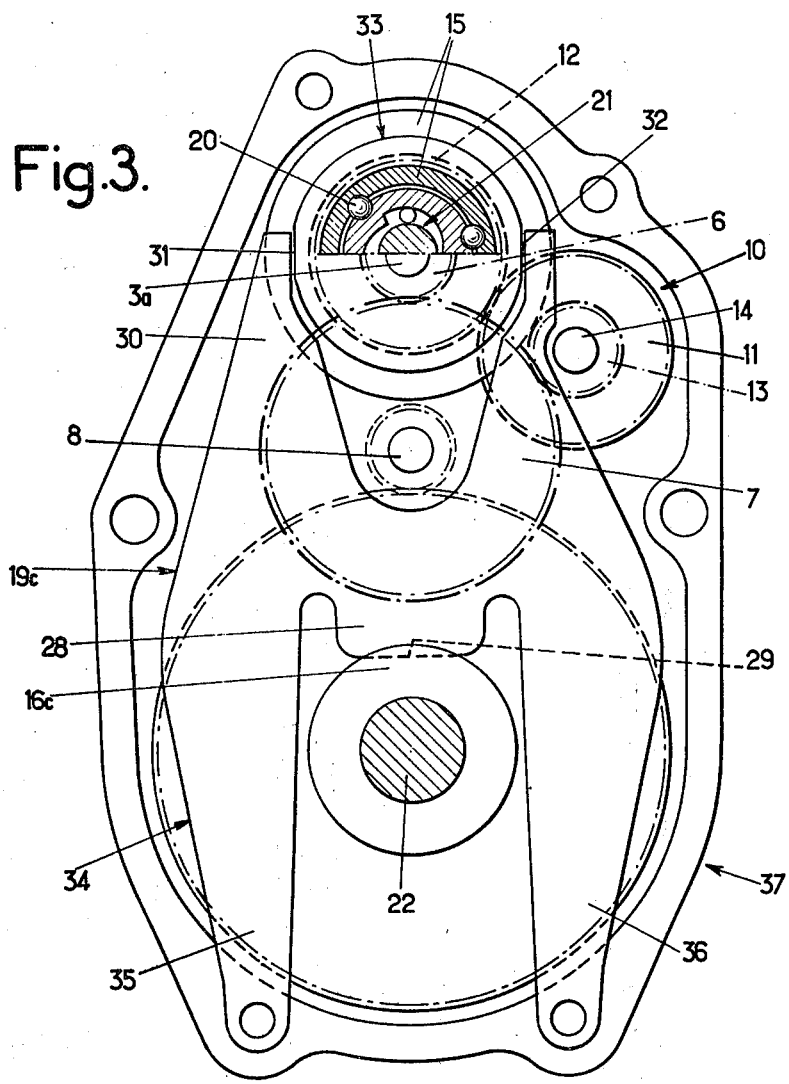
FIG. 3 is a view along line III of FIG. 2, wherein some elements of the assistance mechanism are omitted in FIG. 3 to facilitate understanding.

Gearwheel 11 and pinion 13 are carried by a reversing shaft 14, which is parallel with shafts 3a and 8. As shown in FIG. 3, shaft 14 is transversely displaceable so as to provide the indicated meshing.

Gearwheel 12 of the reversing gear may be rotatably connected to shaft 3a by a second clutch E2.

It will be understood that the driven member 1 rotates in a first direction when the rotational movement is transmitted, from shaft 3a, through clutch E1, pinion 6, gearwheel 7, pinion 9 and gearwheel 5.

The driven member 1 rotates in the opposite direction, at the same absolute speed, when the rotational movement is transmitted, from shaft 3a, through clutch E2 and the reversing means 10 up to gearwheel 7.

Clutches E1 and E2 comprise respectively, a plate 6a, which is integral with pinion 6, and a plate 12a, which is integral with gearwheel 12. These plates are able to be rotated alternately by friction rings 6b and 12b, which are interlocked in rotation with a slider 15. Slider 15 is mounted to freely slide on shaft 3a of the motor and is rotatably connected to shaft 3a by means of splines and complementary grooves, parallel to the axis of shaft 3a.

The means for controlling clutches E1 and E2 is a sliding part 16, which is coaxial with the driven member 1. Part 16 is mounted to freely rotate on member 1 but is connected for translational movement to this member. Part 16 and member 1 slide, in the axial direction, against resilient return means formed by two helical return springs 17 and 18.

The rotational freedom of part 16 and its axial retention on driven member 1 and against gearwheel 5 is provided by means of bearing rings 16a and 16b which have a low coefficient of friction.

The means for controlling clutches E1 and E2 further comprises connection means L between the sliding part 16 and the clutches.

This connection means, L, is formed by a mobile plate 19 cooperating with the sliding part 16. In the embodiment of FIG. 1, plate 19 is integral with part 16. Plate 19 and slider 15 are connected for translation, with little or no play, by engaging end 19a of the plate in a recess, such as a groove 15a, of slider 15.

Part 16 may form an integral part of plate 19, or be fixed thereto by screwing or crimping. Plate 19 transmits any translation of part 16 to slider 15.

Spring 17 is disposed between bearing P1 and part 16, with ring 16a positioned therebetween. The other spring 18 is disposed between bearing P2 and gearwheel 5.

The operation of the assistance mechanism of FIG. 1 is the following.

When no drive torque is applied to shaft 2, plate 19 occupies a rest position determined by the equilibrium of springs 17 and 18. This position corresponds to the disengaged position of the two clutches E1 and E2.

Thus, any rotation of motor 3 and consequently, shaft 3a and slider 15 is not transmitted to the reduction train 4 and to the driven member 1.

When a drive torque is applied to shaft 2, the rotation of this shaft causes driven member 1 to rotate. Due to the gear reaction between teeth 1a and rack C and the axial freedom of driven member 1, driven member 1 will move in one direction or the other, depending on the direction of the torque applied, against one of springs 17 and 18. The amplitude of the sliding movement of driven member 1 depends on that of the torque applied.

Part 16 and plate 19 move in translation with driven member 1. This movement is transmitted to slider 15.

When the torque exerted on shaft 2 remains below a given threshold, the movement of slider 15 is insufficient to engage one of clutches E1 and E2. If motor 3 (which is either permanently energized or actuated by a starting device, known per se, and responsive to the torque exerted on shaft 2, for a torque value less than a given threshold) rotates, reducer 4 will not transmit any assistance to the rotation of member 1, because it is not coupled to motor 3.

If this motor 3 does not rotate because of a hitch, the rotation of reducer 4 and reversing gear 10, caused by that of shaft 2 and driven member 1, is not transmitted to shaft 3a of the motor.

When the drive torque exerted on shaft 2 is greater than the given threshold, the movement of slider 15 becomes sufficient to engage that one of clutches E1 and E2 which allows reducer 4 to be driven in the appropriate direction for driving gearwheel 5 in the same direction as the torque applied to shaft 2.

For a first sliding direction (towards the right in the representation of FIG. 1) of part 16, of plate 19 and of slider 15, clutch E1 is engaged and consequently pinion 6 and gearwheel 7 are driven in a first rotational direction. For the other sliding direction of plate 19 and of slider 15, clutch E2 is engaged and, consequently, gearwheel 7 is driven by the reversing means 10, i.e. by gearwheels 12 and 11 and pinion 13.

Figure 2:
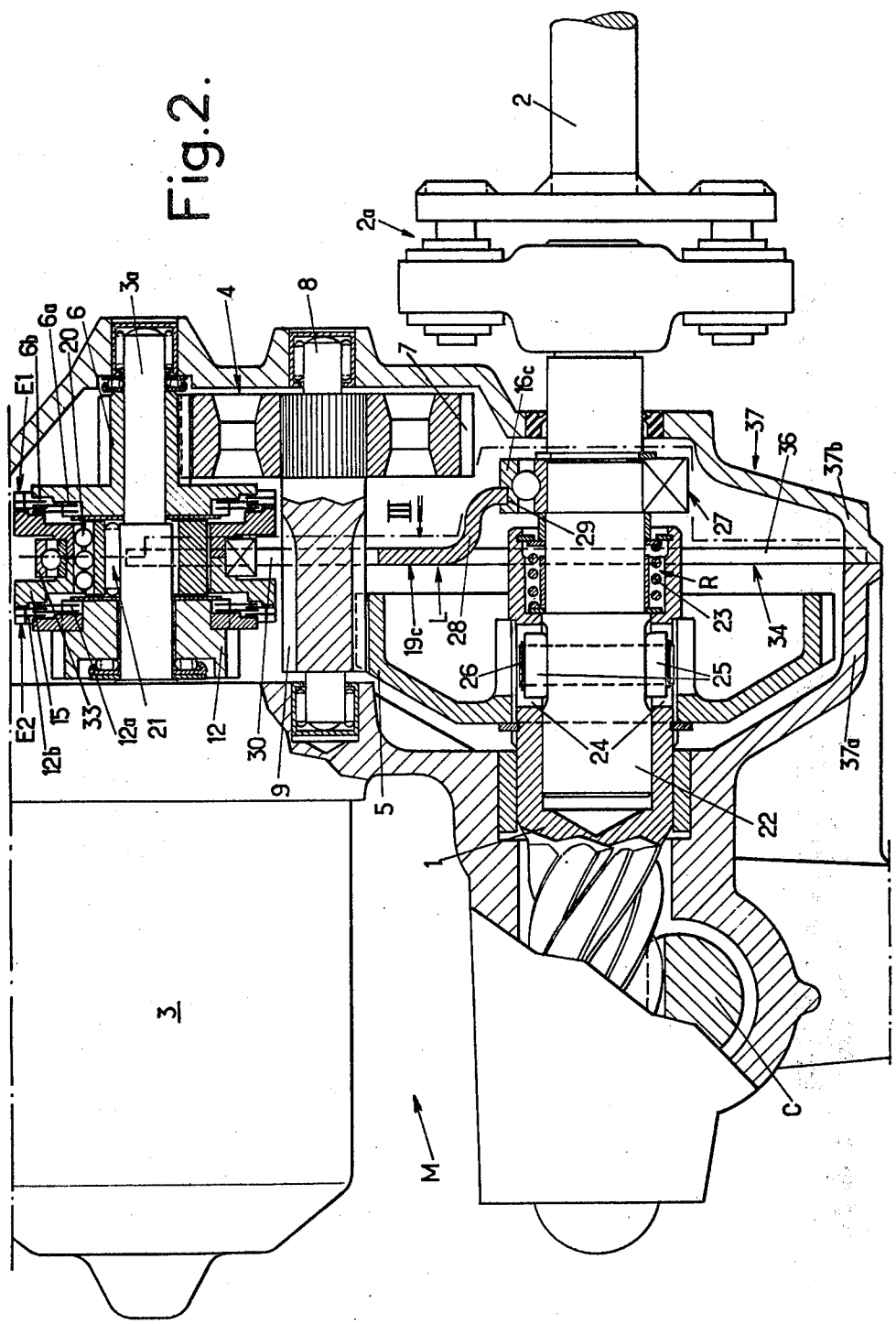
FIG. 2 is a longitudinal section, with outside parts, of another embodiment of the assistance mechanism.

FIGS. 2 and 3 show another embodiment of the present invention. In these drawings, parts similar to those already described with reference to FIG. 1, or playing similar roles, are designated by the same reference numbers to which the letter c has possibly been added. For this reason, the description of these parts will not be taken up again in detail.

It can be seen in FIG. 2 that the rotational connection of slider 15 and shaft 3a is provided by ball splines 20. The ball splines also facilitate axial sliding of slider 15 on shaft 3a. Furthermore, a freewheel 21 is disposed between slider 15 and shaft 3a. The arrangement of this freewheel 21 is such that it ensures rotation of slider 15 so that driven member 1 is rotated by motor 3 and shaft 3a in the direction motor 3 rotates. Freewheel 21 prevents motor 3 from being driven in the opposite direction by slider 15 and by drive shaft 2 when motor 3 is not operating.

Driven member 1, in the embodiment of FIG. 2, is secured against axial movement while remaining free to rotate. A cylindrical body 22, coaxial with member 1, is mounted to slide in the axial direction within a blind bore of member 1. This body 22 may slide on either side of a rest position, against a resilient return means formed by a single double-acting spring 23, depending on whether the drive torque exerted on shaft 2 is directed in one direction or the other. The axial thrust of body 22, in response to the application of a torque to shaft 2, is obtained by a reaction against the inclined edges of apertures 24 provided in rotary member 1, of rollers 25, which are carried by a shaft 26 and engaged in a diametrical bore of cylindrical body 22. Shaft 26 is interlocked in translation and rotation with body 22.

Sliding part 16c is formed by the outer ring of a ball-bearing 27 whose inner ring is fixed for translational and rotational movement to body 22. Part 16c is therefore free to rotate with respect to body 22 but is connected for translational movement to this body.

The connection plate 19c comprises an intermediate curved part 28 one edge of which is engaged in a recess 29 of part 16c, as can be seen in FIGS. 2 and 3. The portion of plate 19c situated, with respect to the median portion 28 on the motor 3 side, ends in a two-pronged fork 30 (FIG. 3). The inner edges of each prong are engaged, with minimum play, in two recesses 31 and 32 provided in the outer ring of a bearing 33 carried by the slider 15.

The other end portion of plate 19c also forms a fork 34 (FIG. 3) with two prongs 35 and 36, whose ends are secured against motion between two elements 37a and 37b (FIG. 2) of casing 37 containing the reduction means and the shafts of the mechanism. Prongs 35 and 36 are relatively thin and long so as to have sufficient flexibility for allowing the median portion 28 to accompany any sliding of part 16c by bending slightly, so that fork 30, situated at the other end, transmits to slider 15 a translational movement amplified with respect to that of part 16c.

The operation of the assistance mechanism shown in FIGS. 2 and 3 is similar to that of FIG. 1.

The application of a torque to drive shaft 2 causes axial sliding of body 22 against the resilient return means 23. Part 16c moves with body 22. This translational movement is amplified by the connection plate 19c and transmitted to slider 15. Clutch E1 or E2, associated with the direction of movement, is actuated if this movement is sufficient. The assistance of the rotation of member 1 is then provided by the motor.

Clutches E1, E2 of FIGS. 1 and 2 and the freewheel 21 of FIG. 2 have reduced dimensions. In fact, they have only a small torque to transmit since they are disposed on a shaft rotating faster than the rotary member 1 and are therefore subjected to a smaller torque. In the embodiments described, clutches E1 and E2 and freewheel 21 are provided directly on shaft 3a, at the input of the reduction means, and consequently, are on the fastest rotating shaft. The ratio of the torque on rotary member 1 to the torque withstood by clutches E1 and E2 and the freewheel 21 is then equal to the reduction ratio of the reduction means (input speed/output speed).

To ensure friction coupling, it will be sufficient to exert a relatively small axial thrust on slider 15. Mobile plate 19 or 19c, which exerts this thrust is therefore only subjected to low stresses and consequently, are made of light construction. These plates only introduce a negligible resistance to the rotation of member 1 by the axial thrust of part 16 against the bearing rings 16a and 16b or by the axial thrust of part 16c formed by the outer ring of a bearing.

It is clear that the invention also applies to the case where motor 3 is provided to rotate in both directions and where a single clutch is used with a single reduction train having no gearwheels for reversing the direction of rotation.

Variations of construction may be contemplated. More particularly, the connections of mobile plate 19 or 19c with slider 15, part 16 or 16c and case 37 could form hinged connections. In the case of such a hinged connection with case 37, prongs 35, 36 of fork 34 (FIG. 3) could be rigid with plate 19c then forming a hinged lever.

I claim:

1. A rotary assistance mechanism, adapted to be coupled to a rotatable driven member capable of turning in opposite directions in response to a torque applied by a rotating drive shaft, said rotary assistance mechanism comprising:
    a motor with a rotatable output shaft;
    a rotatable speed reducer mounted for transmitting rotation between said output shaft and said driven member, said speed reducer having at least one intermediate shaft so that when said speed reducer is driven by the motor, said driven member rotates in either of said opposite directions at a speed lower than the rotation speeds of the shafts formed by said motor output shaft and said at least one intermediate shaft;
    a sliding part coaxial with said driven member, said sliding part being slidable in response to a torque transmittal to the driven member;
    resilient means mounted to exert an action against sliding of said sliding part so that said sliding part may slide in relation to the amplitude and the direction of the torque applied by said drive shaft;
    and at least one clutch mounted on one of said shafts which rotate faster than the driven member, said at least one clutch being actuated when said sliding part slides against said resilient means, whereby when said at least one clutch is actuated, said output shaft is coupled to said speed reducer so that rotation of the output shaft by said motor assists in the rotation of said driven member.

2. The assistance mechanism according to claim 1, further comprising:
    a mobile plate having one end connected to said sliding part and an opposite end positioned to engage said at least one clutch.

3. The assistance mechanism according to claim 2, wherein said sliding part is positioned to freely rotate around said driven member.

4. The assistance mechanism according to claim 2, wherein said sliding part is positioned to freely rotate around said drive shaft which is coaxial with said driven member.

5. The assistance mechanism according to claim 1 further comprising:
    a mobile plate having one end connected to a casing surrounding both said speed reducer and said at least one clutch; an intermediate part connected to said sliding part; and an opposite end positioned to engage said at least one clutch,
    said mobile plate forming a lever.

6. The assistance mechanism according to claim 5, wherein said one end of said mobile plate is shaped like a fork with two prongs, said two prongs being secured to said casing and being long and thin so that said mobile plate has sufficient flexibility to allow said sliding part to slide against said resilient means.

7. The assistance mechanism according to claim 2, wherein the output shaft of said motor is rotatable in only one direction and said speed reducer comprises:
    a rotatable reduction-gear train; and
    means for reversing the direction in which said reduction-gear train rotates coupled to said reduction-gear train, whereby a first clutch connects the output shaft to said reduction-gear train while a second clutch connects the output shaft to said reduction-gear train by way of said means for reversing, said first clutch and said second clutch being coaxially mounted on said output shaft and alternately engaged when said sliding part slides against said resilient means.

8. The assistance mechanism according to claim 7, further comprising:
    a slider mounted on said output shaft to freely slide on and rotate with said output shaft, said slider having two axially spaced end faces, wherein said first clutch and said second clutch, which are in the shape of friction rings, are each locked to one of said end faces.

9. The assistance mechanism according to claim 2, further comprising:
    a freewheel positioned within a space between said slider and said output shaft to ensure that the slider rotates in the same direction as said output shaft.

* * * * *